Figure 1:
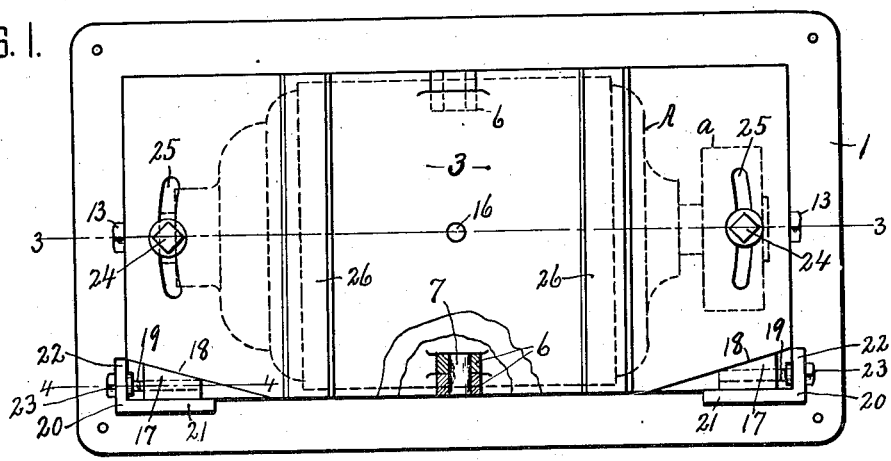

July 31, 1923.

W. C. SERRELL ET AL

MOTOR SUPPORT

Filed Nov. 13, 1922

1,463,406

INVENTOR
Wm C. Serrell
C. E. Widmeyer
BY
Howard P. Denison
ATTORNEY.

Patented July 31, 1923.

1,463,406

UNITED STATES PATENT OFFICE.

WILLIAM C. SERRELL, OF SYRACUSE, AND CHARLES E. WIDMEYER, OF BEAVER FALLS, NEW YORK.

MOTOR SUPPORT.

Application filed November 13, 1922. Serial No. 600,776.

*To all whom it may concern:*

Be it known that we, WILLIAM C. SERRELL and CHARLES E. WIDMEYER, of Syracuse and Beaver Falls, respectively, in the counties of Onandaga and Lewis, respectively, in the State of New York, have invented new and useful Improvements in Motor Supports, of which the following, taken in connection with the accompanying drawings, is a full, clear, and exact description.

This invention relates to an adjustable supporting base for electric motors and other power units for imparting motion to another element through the medium of a belt or other power transmitting mechanism.

In installations of this character where the driving and driven elements are to revolve about fixed axes it is highly important that those axes be exactly parallel to operate with the greatest degree of efficiency and, inasmuch as the driven element such for example, as a line shaft is usually installed prior to the installation of the motor, it becomes necessary to provide means whereby the motor or other power unit may be brought into parallel relation to the driven element, and the main object of my present invention is to provide means operable at will while the motor is in action or at rest for adjusting and setting the motor in proper running relation to the driven element.

In other words, we have sought to provide a sectional supporting base in which the motor supporting section may be adjusted angularly about the different axes at right angles to each other and automatically locked in its adjusted position by the adjusting elements.

Figure 2:
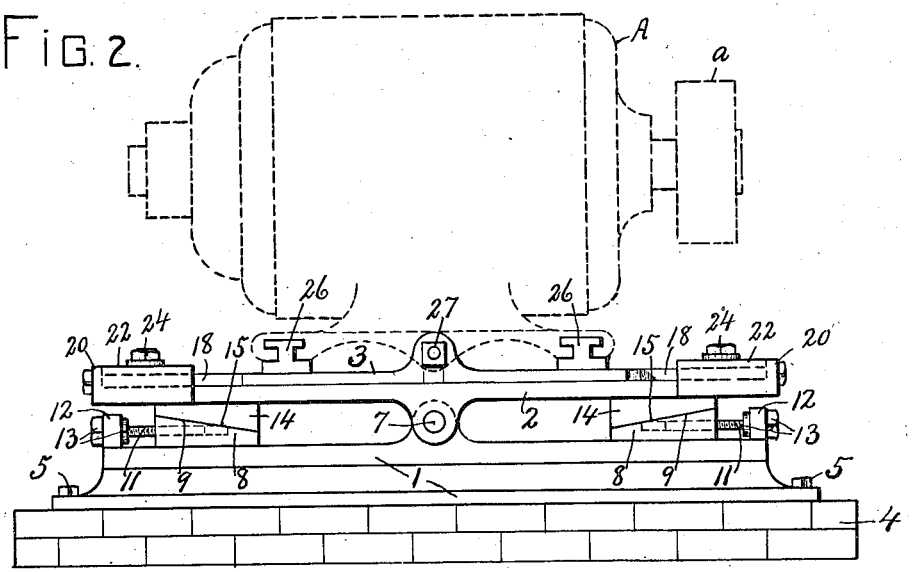

Other objects and uses relating to specific parts of the device will be brought out in the following description:

In the drawings:

Figures 1 and 2 are respectively a top plan and a side elevation of an adjustable motor supporting base embodying the various features of our invention, the motor being shown by dotted lines.

Figure 3:
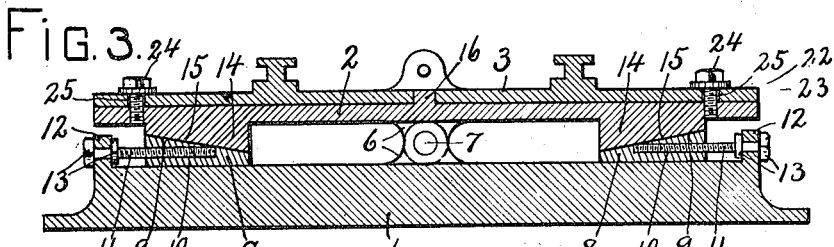
Figure 4:
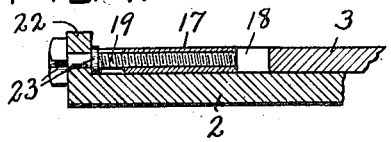

Figures 3 and 4 are sectional views taken respectively on lines 3—3 and 4—4, Figure 1.

As illustrated, this motor support comprises a relatively fixed base section —1— and superposed relatively adjustable sections —2— and —3— together with suitable devices for adjusting the relatively movable sections and holding them in their adjusted positions.

The base section —1— is mounted in a horizontal plane upon a solid foundation as —4— of masonry or other suitable support and may be anchored thereto by bolts —5— to rigidly hold it against relative movement upon its foundation.

The adjacent sides of the base plate —1— and superposed plate —2— are provided with registering ears or lugs —6— substantially midway between their ends and pivotally connected to each other by transverse pivotal pins —7— to permit the plate —2— to rock vertically about the horizontal axis of said pivot for effecting a corresponding vertically tilting adjustment of the motor —A— which is carried by the upper plate —3—.

Suitable means is provided for effecting this vertical adjustment from either end of the plates while the motor is in action or at rest and for holding the plate in its adjusted position, said means consisting in this instance of a pair of wedges —8— mounted upon the flat upper face of the base plate —1— at opposite sides of the pivots —7— and approximately equal distances therefrom, said wedges being provided with oppositely inclined upper bearing faces —9— lengthwise thereof for receiving and supporting the plate —2—.

These wedges are also provided with lengthwise threaded sockets —10— extending inwardly from the outer ends thereof, for receiving a pair of adjusting screws —11— which are journaled in raised lugs —12— on the outer ends of the base plate —1— and are held against endwise movement by shoulders —13— engaging the inner and outer faces of the adjacent lugs, the outer shoulders being preferably angular for the reception of wrench or equivalent to, whereby the screws may be turned for adjusting the wedges endwise along the upper surface of the base plate.

The plate —2— is provided on its underside with pendant bosses —14— having opposite longitudinally inclined bearing faces —15— registering with their resting faces upon the corresponding wedges —8— to afford firm support for the ends of the plate —2— in addition to that afforded by the pivotal pins —7—.

It is now evident that by simultaneously adjusting both of the wedges —8— in a reverse direction will cause a corresponding vertical tilting movement about the axis of the pivots —7— thereby effecting a similar vertical tilting movement of the plate —3— and motor —A— carried thereby as may be required to bring the motor into proper running relation to the driven element not shown so far as this particular adjustment is concerned, it being understood that when the adjustment is effected the wedges —8— and parts adjusted thereby will be automatically held in their adjusted positions providing the wedges are tightened by their respective screws against the adjacent inclined bearings —15—.

The plate —3— is centrally pivoted by a vertical pivotal pin —16— to the plate —2— to swing horizontally about a vertical axis at right angles through that of the pivots —7—, the pivots —16— being preferably directly over the axis of the pivots —7— and therefore substantially midway between the ends of the plates.

Suitable means is provided for adjusting the plate —3— and motor carried thereby horizontally or angularly about the axis of the pivot —16— said means consisting in this instance of a pair of wedges —17— cooperating with oppositely inclined longitudinal bearing faces —18— on the opposite ends of one side of the plate —3—, Figure 1 and are adjustable endwise by screws —19—.

That is, the plate —2— is provided at the ends of one side thereof with angular flanges —20— forming lengthwise guide flanges —21— and end abutments —22— projecting upwardly from the plate —2— above the adjacent portions of the plate —3—.

The flanges —21— serve as guides for the outer lengthwise edges of the wedges —17— which are movable along and upon the upper surface of the plate —3— and between the flanges —21—, and inclined bearing faces —18— so that by simultaneously adjusting both of the wedges —17— in one direction or in a reverse direction will produce a corresponding horizontal rocking movement of the plate —3— and motor carried thereby independently of the vertical tilting adjustment of the plate —2—.

The screws —19— are engaging in threaded apertures in their respectively wedges —17— as shown in Figure 4 and their outer ends are journaled in the abutments —22— and are held against endwise movement by shoulders —23— thereon engaging the inner and outer faces of the corresponding abutments —22.

When the plate —3— with the motor thereon has been properly adjusted, said plate may be firmly clamped to the plate —2— against relative vertical movement by means of clamping bolts —24— which are screwed in suitable apertures in the plate —2— and extended through laterally elongated slots —25— in the plate —3— concentric with the pivot —16— and of sufficient length to allow a limited lateral adjustment of the plate —2— with the motor thereon by means of the wedges —17— and screws —19— without removing the clamping bolts —24—.

The motor —A— may be secured to the upper face of the plate —3— by any suitable fastening means, but is preferably mounted upon transverse ways —26— for independent lateral adjustment as for example, aligning its shaft with a coaxial driven element not shown and held in its adjusted position by suitable screws —27— on the plate —3—, and may also serve as a means for adjusting the tension of the belt.

The angular adjustment of the motor supporting plates —2— and —3— are particularly useful in adjusting the motor —A— in transmitting motion to a driven element by means of a belt carried by suitable pulleys —a— on the motor shaft and driven element, as for example, a shaft parallel with which the motor shaft is adapted to be brought into parallel relation.

It is, of course, understood that in setting the motor it would be arranged as nearly as possible parallel with the driven shaft, but if after the first setting it is found to be at an angle horizontally to the driven element, it may be brought into parallelism by the proper adjustment of the plate —3— through the medium of the wedges —17— and screws —19—.

On the other hand, if the motor shaft is out of parallel vertically with the driven element it may be brought into parallelism by the proper adjustment of the wedges —8— through the medium of the screws —11— with the assurance that when both adjustments are completed, the motor and adjustable plates will be automatically locked in their adjusted position which permits the adjustments to be made while the motor is in action or as well as when it rests.

The operation of our invention will now be readily understood upon reference to the foregoing description and the accompanying drawing, and while the motor supporting plates and adjusting means therefore, as shown and described are preferable, we do not wish to limit ourselves to this particular disclosure.

What we claim is:

1. A motor support and means for adjusting said support angularly in two different planes at right angles to each other, said means including a pair of opposed wedges for effecting the adjustment in one plane and a separate pair of wedges for effecting the adjustment in the other plane.

2. In a motor support, a relatively fixed base plate, a movable plate pivotally mounted on the base plate to rock vertically, means for adjusting the last named plate about the axis of the pivot and a motor supporting plate pivoted to the second named plate to swing horizontally and means for adjusting the last named plate about the axis of its pivot.

In witness whereof we have hereunto set our hands this 30th day of October 1922.

WILLIAM C. SERRELL.
CHARLES E. WIDMEYER.

Witnesses:
H. E. CHASE,
RITA CAMIPOLIETO,
PERRY G. WILLIAMS.
BERTHA A. BROWNELL.